May 1, 1956
W. BERGHOLTZ ET AL
2,744,160
CIRCUIT ARRANGEMENT FOR PULSE CONTROLLED TELEPHONE SYSTEMS
Filed April 30, 1953
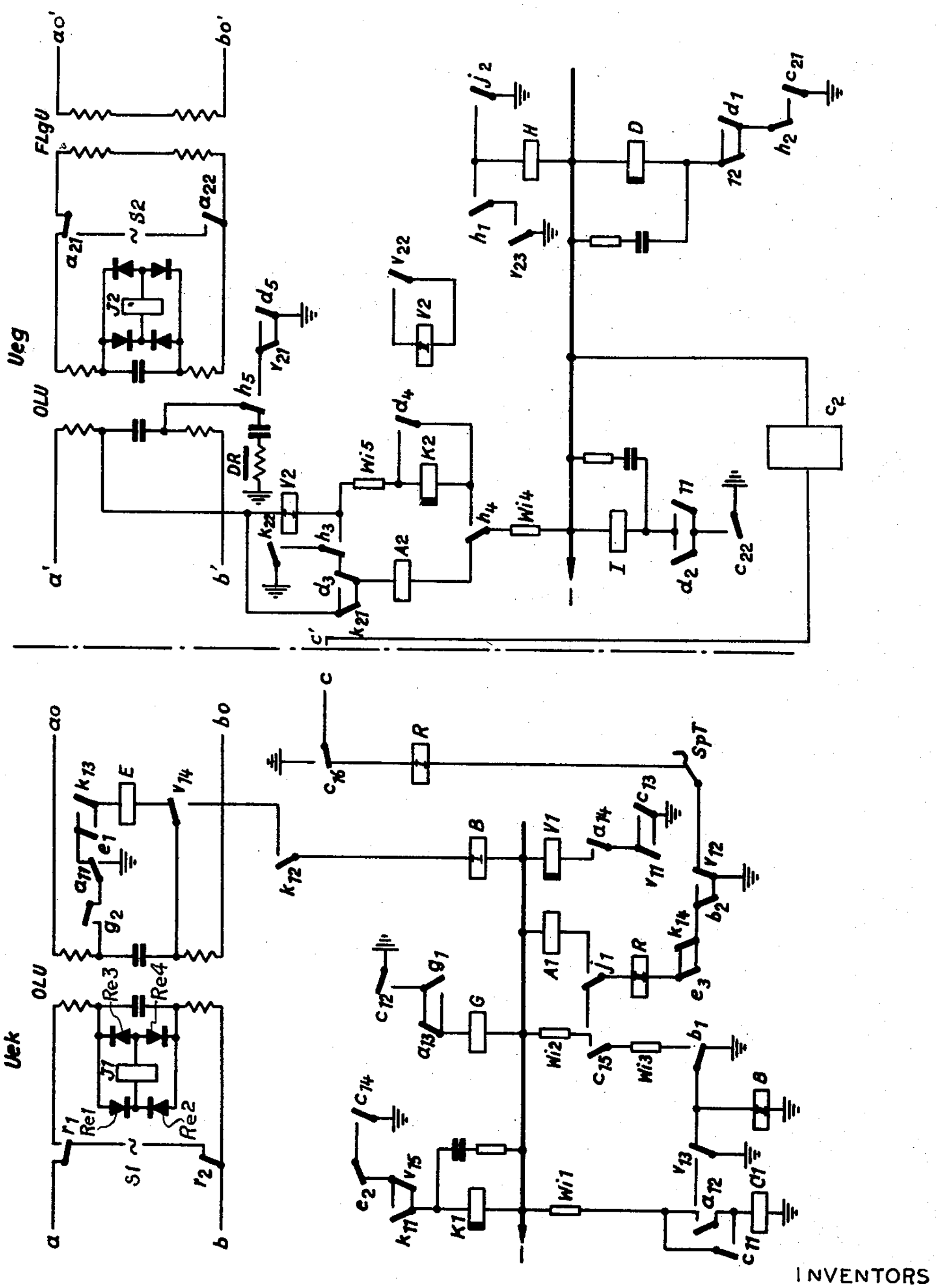
INVENTORS
WILLY BERGHOLTZ
HEINZ PLITSCHKA.
BY
ATTORNEY United States Patent Office 2,744,160

Patented May 1, 1956

2,744,160

CIRCUIT ARRANGEMENT FOR PULSE CONTROLLED TELEPHONE SYSTEMS

Willy Bergholtz and Heinz Plitschka, Stuttgart-Zuffenhausen, Germany, assignors to International Standard Electric Corporation, New York, N. Y., a corporation of Delaware Application April 30, 1953, Serial No. 352,122

Claims priority, application Germany May 2, 1952

3 Claims. (Cl. 179—16)

The present invention relates to telephone installations with lines which are separated by repeaters and in which the control signals are transmitted in both directions by means of impulses.

In local networks it is common practice to generally utilize direct current potentials for controlling the operation of switching devices for other than numerical selection. In the course of expansion of the dial service to trunk connections via lines which are separated by repeaters, however, different methods were required to be employed and resulted in the development of impulse-controlled systems. In these systems the control signals are transmitted as pulses by means of alternating current of voice frequencies. This method furthermore offers the advantage of enabling a wider range of control signals to be obtained than would be possible when employing a direct-current control. Thus, for instance, in long distance dialing, the introduction of the dial terminal signal, the seizing return signal, the recall signal, and other control signals are required and may be achieved through the impulse-controlled signal technique utilizing characteristic frequencies to control the operations.

In impulse control, however, one difficulty consists of the fact that signals are frequently transmitted simultaneously in both directions. Thereby the signals transmitted in the one direction are likely to conflict with those of the opposite direction, whereby the desired switching operations are either prevented, or faulty switching operations will result. Hence there resulted the problem of securing isolation and the proper transmission of signals running in the one or the other directions in the case of a conflict of oppositely directed signals.

According to the prior art, various solutions of this problem are known. As an example, it may happen in telephone systems with double-directed trunks, that a seizure is effected at the same time from both ends. This is prevented in conventional arrangements, whereby, the seizure in a single direction is provided with preference in relation to a simultaneous seizure from the opposite direction. For this purpose switching devices are incorporated at the ends of the trunks effecting a preferential seizure of the one trunk in relation to a simultaneous seizure of the trunk from the other end, by the transmission of different kinds of trains of current pulses.

In other types of known arrangements a preferential seizure of the trunk in a first direction is disregarded. If the trunk is seized at the same time or nearly at the same time from both directions, then a faulty initiation of the metering, caused by the opposite seizing pulse, is prevented in such arrangements whereby, all switching operations (seizure, selection, release) which are to be transmitted in direction of the establishment of the connection, are transmitted by current pulses having a certain characteristic, which characteristic may be, for instance a predetermined frequency (50 C. P. S.), nature of current, or voltage, and that in contrast thereto, the subscriber's signal pulse, which is to be revertively transmitted, is transmitted as a current pulse having a different characteristic, for instance, 100 C. P. S., etc. On the other hand, in such arrangements, during a connection in the outgoing repeater, only such switching devices are applied to the line which permit the reception of subscriber's signal pulses, but not the current pulses which are transmitted in the opposite direction (from the incoming to the outgoing end of the line), owing to a simultaneous seizure of the line.

Other types of circuit arrangements transmit the control signals from the repeater at one end of the line by means of inductively produced direct-current pulses, and from the repeater at the other end of the line by means of alternating current pulses. In the case of a timely coincidence of an inductive releasing pulse with a signal coming in from the opposite direction particularly with the subscriber's signal pulse, there has been provided, in this particular case, switching devices in the outgoing repeater, by means of which, the subscriber's signal pulse is revertively transmitted by the alternating current and is accomplished against an inductive releasing pulse which is transmitted in the direction of the establishment of the connection. The transmission of further inductive releasing pulses, however, is secured after the termination of the alternating-current return pulse in the inductive transmission. This principle is completed and expanded in the course of the further development in such a manner that besides the subscriber's signal pulse, also the seizing pulse and the clearing signal pulse of the calling or called subscriber are also likewise transmitted by alternating current, and occur in relation to an inductive seizing or releasing pulse respectively, which is transmitted at the same time in the opposite direction.

The employment of alternating current pulses of a single frequency but of a different duration for all signals which are to be transmitted in both directions during a connection, is known from the study of other arrangements. In these cases, switching equipments will be affected at the other end of the trunk by means of one or more current pulses (prepulses) which are transmitted in the one direction prior to the transmission of the signal, these switching equipments preventing a transmission of signals in the opposite direction. The transmission of signals in the one direction (for instance, the backwardly directed current pulses for the busy signal and, the answering signal of the called subscriber) will be temporarily interrupted by a signal transmission in the other direction (for instance, by calling in the forward direction), and will be automatically resumed as soon as the signal transmission in the other direction is interrupted. A signal transmission in the opposite direction, however, will finally be interrupted entirely by the transmission of the release signal. In these arrangements the signals which proceed from the outgoing end are given priority always against those signals proceeding in the opposite direction, which means, that in this case the forwardly directed signals are always privileged.

It has also been previously suggested that in order to avoid faulty switching, caused by oppositely travelling pulses, that pulses travelling in one direction, for instance, the backward direction, are chosen to have a longer duration than those travelling in the other direction. The receiving relay for the longer duration pulses must be switched in this case, by employing special means, in such a manner that it is ready to receive, in all events, during the intervals of the shorter pulses. Since the arrival of the shorter pulses is also sufficiently indicated, it will thus be possible to ascertain the timely coincidence of oppositely-directed pulses. If it should happen in this arrangement that forwardly directed pulses and backwardly directed pulses meet each other, then directly or indirectly the release will be initiated. A possibility has been provided according to which, at the transmission of certain control signals (for instance recall signals, i. e. if the party establishing the connection (exchange operator) transmits a signal in the forward direction after the termination of the actual conversation in order to maintain, and not to disconnect the existing connection), the release circuit will not be actuated, in that the pulse ratio will be reversed and the receiving relay of that direction which is not privileged now, will be prevented from pulling up by means of switching operations. In this connection it has also been previously suggested, when performing the control from a certain end (such as the trunk exchange) to prevent the switching process, initiated by the release circuit, from becoming effective, so that the former condition remains and allows the repetition of the desired switching process.

According to gathered experiences it has proved to be unpractical in the traffic between the two points A and B to always prefer the one direction (for instance from A to B). For this reason such systems in which, as mentioned above, inductively produced current pulses are always applied to the trunk from the one side, and alternating current impulses are applied to the trunk from the other side, are apparently unsuitable in many cases. Other types of the above-mentioned arrangements require a relatively large amount of expensive switching means because of the necessity of utilizing equipment which is selectively responsive to signals of several frequencies or of different current characteristics. The proposal, according to which the release shall be initiated upon the timely coincidence of oppositely directed pulses, is likewise unsuitable to properly solve the problem. Nor is the problem satisfactorily solved to always have forwardly preferentially directed pulses control the signal responsive equipment as there are situations which cannot be catered for with such an arrangement. In all of the known types of arrangement, it is impossible to secure a timely coincidence of oppositely directed signals, according to the requirements for either the forwardly directed signals or the backwardly directed signals. Hence it may be desirable to suppress forwardly directed dialing pulses if the dial terminal signal is transmitted in the backward direction. However, on the other hand the recall signal, for instance, must be sent forward and is to occur despite a backwardly directed signal.

For the employment in pulse-controlled telephone systems with lines which are separated by repeaters, therefore, it is suggested according to the present invention, for the event of a timely coincidence directed signals which are built up on the principle of suppression signals proceeding in the one direction, in favour of the oppositely proceeding signals, to suppress, for the purpose of securing the transmission of certain control signals in dependency of the momentary circuit condition of the connecting stage, either the forwardly directed signals, or the backwardly directed signals in the alternating current repeater.

According to the invention, therefore, dependent upon the condition of the circuit, the forward or the backwardly directed signals are to be suppressed in the alternating current repeater. In this respect the first occurrence of the clearing signal is always regarded as the criterion. For this purpose said clearing signal is proposed to consist of: a long impulse, and a short interval. Upon the occurrence of oppositely directed signals, the transmission of backwardly directed signals will be secured prior to the transmission of the clearing signal, and the transmission of the forwardly directed signals will be secured after the first transmission of the clearing signal.

The accompanying drawing shows a portion of an outgoing and incoming alternating current repeater utilizing the invention and will aid in better understanding the invention which will now be described.

Referring to the drawing, there is shown a pair of repeaters, UEK and UEG located in different offices. Repeater UEK is an incoming repeater having a pair of input wires *a*, *b* and a pair of output wires *ao*, *bo*. Correspondingly, repeater UEG is an outgoing repeater having a pair of input wires *a'*, *b'*, and a pair of output wires *ao'*, *bo'*. Additionally there is a "*c*" or test lead between the repeaters.

The "*c*" lead at the outgoing repeater UEG is connected through the winding of relay C2 to minus potential. The "*c*" lead at the incoming repeater UEK is connected through back contact *c*16, the winding I of a two-winding relay R, switch contact S*pt*, back contact *v*12 to plus potential. The winding I of relay R is of considerably higher resistance than the winding of relay C2 and consequently relay R is normally energized but passes insufficient current to energize relay C2. Thus, front contact *r*1 normally connects line *a* to top terminal of the left-hand winding of transformer OLU and contact *r*2 is normally open, thereby permitting the *b* line to be connected to the lower terminal of the left-hand winding of transformer OLU. There is thus completed an incoming loop over lines *a*, *b* to pulse receiving relay J1 through the rectifier network R*e*1 . . . R*e*4. For the purpose of seizing the incoming repeater, relay J1 is energized in the conventional manner by means of an impulse received via lines *a*, *b*, and thereby causes operation of relay A1 via:

$$\text{plus}, b2, \frac{e3}{k14}, \text{R(II)}, j1 \text{ front}, \text{A1}, \text{minus}$$

and thereafter the seizure relay C1 operates via plus, C1, *a*12, W*i*1, minus locks itself via its holding contact *c*11. Front contact *c*16 applies full plus potential to the outgoing *c*-wire and thereby energizes relay C2 which seizes the outgoing alternating current repeater U*eg* in the usual manner. If, after the termination of the seizure pulse, relay A1 drops off again, then relay G will be operated via:

plus, *c*12, *a*13, G, minus and locks itself via its holding contact *g*1. Apart therefrom contact *c*14 closes the circuit for relay K1 via:

plus, *c*14, *e*2, *v*15, K1, minus

Relay K1 locks itself via a holding circuit via contact *k*11. In the meanwhile relay R is maintained energized via its second winding 11, after winding I had been disconnected by *c*16 over the following path:

plus, *b*2 back, *e*3 back, R(II), *j*1 back, *c*15 front, W*i*2, minus

Upon the transmission over pulses, the alternating current impulses which travel over the *a*/*b*-wires, will be received by relay J1 over the rectifier network R*e*1 . . . R*e*4 and will be repeated by relay A1 via contacts *a*11 and *g*2 as direct-current pulses along the *a'*-wire to the outgoing alternating current repeater U*eg*. Thereby, at the beginning of the train of pulses, slow-release relay V1 will be energized and continues to hold itself for the duration of the train of pulses via:

plus, *c*13, *a*14, V1, minus

Therewith the winding I of relay B is interconnected via *v*14 front, *k*12, B (1), minus, to the *b'*-wire leaving U*ek* for the duration of a transmitted train of pulses and is ready to receive all backwardly directed pulses which are likely to be received via the *b'*-wire during this time.

As stated before, the seizure relay C2 in repeater UEG was energized at the seizure, by operation of the *c*16 contact in repeater UEK. Due to the operation of relay C2 the relays D and I will be successively energized and held via the following two circuits:

plus, *c*21, *h*2, 12, D, minus and plus, *c*22, *d*2, I, minus

Owing to a parallel-connected condenser and resistance, relay D has a relatively great time delay in its release so that it is able to overcome short interruptions of its steady current energizing circuit, as are likely to occur upon the arrival of short backwardly directed pulses (such as dial terminal signal, subscriber's signal pulse) and will drop off only if a long lasting signal (clearing signal) is received.

Forwardly directed pulses, as for instance, the dialing pulses, are transmitted as direct current pulses via the following path:

plus, *a*11, *g*2 in U*ek*, *a*-wire, to *a*-wire in U*eg*, *k*21, A2, *h*4, W*i*4, minus Thereupon relay A2 transfers via its contacts *a*21 and *a*22 the signals from alternating current source S2 as alternating current pulses on to the outgoing conducting speaking wires, *ao'*, *bo'* via the transformer F*lg*U.

Backwardly directed pulses, coming from the trunk line *ao'*, *bo'*, such as the dial terminal or subscriber's signal, will be received in the normal case, which means that if no forwardly directed pulses are being transmitted at the same time, the position of contacts *a*21 and *a*22 in the repeater U*eg* will cause receiving relay J2 to respond to the alternating current backwardly directed pulses, and which pulses will be transferred with the aid of contacts *i*2 to relay H. The transfer is carried out via the circuit:

plus, $\frac{d5}{v21}$, *h*5 front in U*eg*, *b'*-wire, to U*ek*, *v*14 back, E, *k*13, *a*11 back, *g*2, *ao*-wire, *a'* wire, V2(I), W*i*5, *d*4, *h*4 front, W*i*4, minus While the last traced path includes both the windings of relay E and the second winding II of relay V2, only relay E will operate since its winding is of considerably higher resistance than the winding II of relay V2 and consequently relay V2 will not operate since relay E will not pass sufficient current to render relay V2 operable. Since relay K1 in U*ek* has the same long delay in respect to its release, as relay D has in U*eg*, contact *e*2 cannot release relay K1 in the course of a momentary interruption. In contrast thereto the circuit for winding II of relay R is opened by contact *e*3 and relay R drops off. For the duration of the time of interruption, an alternating current pulse is given via contacts *r*1 back and *r*2 backwards as shown, on to the incoming connected line *a*, *b*.

As an example it is now assumed that the dial terminal signal proceeds backwards after the completion of the numerical selection, but that the calling subscriber erroneously still dials another number. According to what has been described in the foregoing, slow-release relay V1 in U*ek* is energized and relay B is ready to receive the series of forwardly-directed pulses, which in this case corresponds to the additionally dialed number. The contacts *a*21 and *a*22 in the repeater U*eg* transmit the alternating current pulses from source S2. Since the dial terminal signal, which arrives at the same time from the opposite direction, consists of pulses which are nearly doubly as long as the dialing pulses, receiving relay J2 can safely pull up in one interval between two current pulses which are to be transmitted and can immediately energize relay H via the *j*2 contact. Contact *h*4 removes the incoming dialing pulses from pulse relay A2 and conducts them via V2(I). The train of current pulses (dialing pulses), which is transmitted in the forward direction, is immediately interrupted and rendered innocuous by the disconnection of A2, and relay V2 is energized instead, achieving a delayed release by short-circuiting its winding II by means of its associated contact *v*22.

On the other hand the dial terminal signal will be transferred backwards:

plus, *d*5, *h*5 front in U*eg*, *b*-wire, to U*ek*, *v*14 front, *k*12, B(I), minus Relay B continues to hold itself in the circuit:

plus, B(II), *b*1 front, W*i*3, *c*15, W*i*2, minus

In the meanwhile the remainder of the incoming train of dialed pulses is received by J1 in the repeater U*ek* and is repeated by A1 as previously explained, but is not transmitted via lines *ao'*, *bo'* since relay A2 is still energized and its contacts A21 and A22 effectively disconnect wires *a'*, *b'*, from *ao'*, *bo'* as already mentioned. At the end of the forwardly-directed train of pulses the slow-acting relay V1 drops off in U*ek* and via its contact *v*13 back, short-circuits the winding B(II). During the release of B the circuit for relay R is shortly interrupted by *b*2 and during this time the de-energized contacts *r*1 and r2 transfer an alternating current pulse from source S1 backwards over line *a*, *b*, as shown in the drawing. Accordingly, in this case the forwardly-directed signal will be interrupted and the backwardly-directed signal will be sent. Relay H in the outgoing repeater U*eg* holds itself over the contacts *v*23 and *h*1, a sufficiently long time until the forwardly-directed signal has terminated, viz. until relay V2 drops off after the termination of the forwardly-directed signal. Both of the repeaters, U*ek* as well as also U*eg*, return to their former switching condition again thereafter.

The next operation to be described is the backward transmission of the clearing signal. Upon the arrival of the clearing signal, relays J2 and H will be energized in the repeater U*eg* in the same manner as described above in respect to the dial terminal signal. Owing to the fact that the clearing signal is a considerably longer pulse (in this case suggested as being 450 ms.), relay D does not overcome the prolonged opening time of contact *h*2, but is caused to drop off. On its path plus, *v*21, *h*5 front in U*eg*, *b'*-wire, *bo*-wire, *v*14 back, E, *k*13, *a*11 back, *g*2, *ao*-wire, *a'*-wire, V2(I), W*i*5, K2 (subsequently to the opening of *d*4), *h*4 front, W*i*4, minus again only the high resistance winding relay E pulls up and separates or disconnects the circuits for relay K1, and for relay R(II) by means of its now open contacts *e*2 and *e*3 respectively. Contact *e*1 keeps the energizing circuit closed for relay E which, accordingly, is energized just so long as H is energized, viz. as long as the duration of the clearing signal pulse. Relay K1 now drops off owing to the long interrupting time of *e*2, whilst an alternating current pulse is transmitted backwards via the dropped-off contacts *r*1 and *r*2. The duration of this current pulse depends on the release time of K1, because the dropped-off contact *k*14 causes the re-energization of relay R(II). In this manner, a long duration alternating current pulse is transmitted backwards. Subsequent to the transmission of the clearing signal, relay D remains de-energized in U*eg* and is also prevented from pulling up again as long as relay I remains energized; the contact *i*1 being open. The repeater U*ek* again returns to the former switching condition so that any forwardly directed signals, which are still likely to follow, are able to be transmitted freely.

Before concluding this description, it is still desired to consider operation of the invention in a case in which it is assumed that after the first transmission of the clearing signal, a forwardly directed signal, such as a recall signal, coincides with the repetition of a clearing signal proceeding in the opposite direction. As has been previously mentioned, the forwardly directed train of pulses was applied in U*ek* by means of contact *a*11 to the *ao*-wire. Relay B(I) is switched via *v*14 front into the ready-to-receive position. If now a repetition of the clearing signal arrives from the opposite direction in U*eg*, then also in this case relay H disconnects the forwardly-directed train of pulses from A2 and leads it over a path via V2(I), W*i*5 and K2, *h*4 front, W*i*4, minus. Hence both of the relays V2 and K2 will be energized. The backwardly directed signal cannot be applied to the $b'$-wire because relay D is dropped off and it also cannot influence relay B in the repeater *Uek*. Accordingly the backwardly directed signal is completely suppressed. Relay V2 in *Ueg* remains in an energized position for the duration of the whole forwardly directed train of pulses, and also H remains energized to hold itself via the contacts *h*1 and *v*23 during the same period, even if contact *j*2 has possibly dropped off at the end of the clearing signal.

Relay K2 also drops off after a time delay due to its construction, remaining deenergized and awaiting the end of the forwardly directed train of pulses. After the dropping of H, relay A2 will be shortly energized during the releasing time of K2 via:

plus, *k*22, *h*3 back, *d*3 back, A2, *h*4 back, *Wi*4, minus

Hereby one single forwardly directed pulse will be transmitted and the recall signal will be secured accordingly.

With the aid of the described arrangement and in dependency of the momentary circuit condition of the connecting stage, viz. prior to the transmission of the clearing signal, and subsequently to the transmission of the clearing signal, at the coincidence of oppositely directed signals either the forwardly directed signals will be completely interrupted and the transmission of backwardly directed signals will be secured, or the transmission of the backwardly directed signal will be prevented and the train of pulses of the forwardly directed signals, although having been broken off, delivers a single pulse in a forward direction. The present invention includes the possibility for transmitting the last mentioned single pulse as a recall signal, because owing to the fact that the recall signal always is sent, it appears to be unnecessary to transmit a whole train of pulses, for instance a train of "zeros" in order to insure that at least one pulse of the train is received properly.

Even if several alternating current repeaters, which are connected to each other by way of trunks, are switched in series, the described circuit arrangement operates satisfactorily. The respective signal to be secured will be either transmitted without the slightest hitch or is likely, at worst to coincide with an oppositely directed signal in each repeater until after, a timely delay when the momentary coinciding signal has been picked-up and suppressed. In this case the signal, although only moving in an echelon form, will reach its destination safely and unobjectionably.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In an impulse-controlled telephone signalling system utilizing a plurality of two-way impulse repeater stations, a circuit for controlling the directional preference of impulses transmitted between said stations in accordance with the progress of the connection between calling and called stations disposed at opposite termini of said stations respectively, comprising a pair of line wires and a control wire interconnecting said stations, a first of said line wires adapted to become a path for the transmission of forward signals from a first one of said stations to the second one of said stations and the other of said line wires adapted to become a path for the transmission of backward signals from said second station to said first station, separate impulse receiving means at each of said stations, each disposed between said stations and the calling or called stations, respectively, and adapted to respond to forward or backward signals respectively, originating at said calling or called stations, first pulse repeating means at said second stations, an operating circuit for said first repeating means including said first line wire and the impulse receiving means at said first station, said first repeating means adapted to repeat forward signals to said called station, second pulse repeating means at said first station, an operating circuit for said second repeating means including said second line wire and the impulse receiving means at said second station, said second repeating means adapted to repeat backward signals to said calling station, first signal suppressor means at said second station for suppressing operation of said first pulse repeating means, said first suppressor means under control of the impulse receiving means at said second station, whereby forward signals are suppressed during the period backward signals are being received by said last mentioned impulse receiving means, a transfer relay at said first station, an operating path for said transfer relay over both said line wires, said transfer relay under control of said suppressor means, said transfer relay having a contact adapted to disconnect the pulse repeating means at said first station from said first line wire to render said first station in a backward signal receiving condition and delay means to prevent disconnection of said suppressor means until a predetermined time after the receipt of a final backward signal by said second station.

2. A circuit as claimed in claim 1 wherein said delay means comprises a slow-release relay under control of said suppressor means, and adapted to be coupled to said first line wire until the completion of the receipt of said backward signals at said second station.

3. A circuit as claimed in claim 2, wherein said slow-release relay includes a contact in parallel connection with said first pulse repeating means at said second station, said contact adapted to control said first pulse repeating means a predetermined time after the release of said suppressor means, thereby to transmit a forward signal to said called station.

References Cited in the file of this patent

UNITED STATES PATENTS 2,552,780 Hadfield -------------- May 14, 1951